US006457393B1

(12) United States Patent
Englar

(10) Patent No.: US 6,457,393 B1
(45) Date of Patent: Oct. 1, 2002

(54) HYDRAULIC CUTTING SYSTEM WITH CONTROLLED DECELERATION CONDUIT

(75) Inventor: James W. Englar, Moses Lake, WA (US)

(73) Assignee: J.R. Simplot Company, Boise, ID (US)

( * ) Notice: Subject to any disclaimer, the term of this patent is extended or adjusted under 35 U.S.C. 154(b) by 0 days.

(21) Appl. No.: 10/093,307

(22) Filed: Mar. 5, 2002

Related U.S. Application Data

(63) Continuation-in-part of application No. 10/073,086, filed on Feb. 9, 2002.
(60) Provisional application No. 60/273,675, filed on Mar. 6, 2001.

(51) Int. Cl.[7] ............................ A23L 1/00; B26D 1/03; B26D 3/11; B26D 7/06
(52) U.S. Cl. ............................ 83/402; 99/537; 99/538; 83/98; 83/932
(58) Field of Search .................. 99/537, 538, 542–545, 99/516, 586, 571, 623; 83/24, 27, 98, 164, 149, 52, 402, 403, 858, 865, 932; 426/402, 518, 520

(56) References Cited

U.S. PATENT DOCUMENTS

| | | | | |
|---|---|---|---|---|
| 3,024,821 | * | 3/1962 | Bean | 99/586 |
| 3,108,625 | * | 10/1963 | Lamb et al. | 83/402 |
| 3,116,772 | * | 1/1964 | Lamb et al. | 83/27 |
| 4,082,024 | * | 4/1978 | Hodges et al. | 83/402 |
| 4,372,184 | * | 2/1983 | Fisher et al. | 99/543 X |
| 4,423,652 | * | 1/1984 | Winslow | 83/98 X |
| 4,538,491 | * | 9/1985 | Henneuse | 83/402 |
| 4,614,141 | * | 9/1986 | Mendenhall et al. | 99/538 X |
| 4,807,503 | * | 2/1989 | Mendenhall | 99/537 X |
| 5,168,784 | * | 12/1992 | Foster et al. | 83/932 X |
| 5,179,881 | * | 1/1993 | Frey et al. | 99/537 X |
| 5,394,780 | * | 3/1995 | Foster et al. | 99/537 X |

* cited by examiner

*Primary Examiner*—Timothy F. Simone
(74) *Attorney, Agent, or Firm*—Kelly Bauersfeld Lowry & Kelley, LLP

(57) ABSTRACT

An improved hydraulic cutting system is provided for cutting a succession of vegetable products or the like particularly such as potatoes into elongated strips, wherein the cutting system includes a deceleration conduit designed for decelerating cut product strips substantially without flow stream turbulence to reduce or eliminate strip breakage. The cutting system utilizes a propelling fluid flow stream to propel the products with substantial velocity into and through cutting engagement with knife elements of a so-called water knife fixture mounted along the length of a fluid flow passage. An improved deceleration conduit defines a continuation of the fluid flow passage at a downstream side of the water knife, and has a tapered shape which expands in cross section relative to a conduit centerline at an angle not exceeding 9° and preferably on the order of about 2° to about 3°.

20 Claims, 3 Drawing Sheets

HYDRAULIC CUTTING SYSTEM WITH CONTROLLED DECELERATION CONDUIT

BACKGROUND OF THE INVENTION

This is a continuation-in-part of U.S. Ser. No. 10/073,086, filed Feb. 9, 2002.

This application claims the benefit of U.S. Provisional Application No. 60/273,675, filed Mar. 6, 2001.

This invention relates generally to improvements in so-called hydraulic cutting assemblies wherein a vegetable product such as a potato is propelled by a fluid such as water into cutting engagement with knife elements positioned along a fluid flow path to cut the product into elongated strips. More particularly, this invention relates to an improved hydraulic cutting system equipped with a deceleration conduit at a downstream side of the knife elements for controllably decelerating the cut product strips in a manner which substantially reduces or eliminates undesired strip breakage.

Hydraulic cutting systems in general are well known in the art, and typically comprise a so-called water knife fixture having one or more knife elements mounted along the length of an elongated tubular conduit. A pumping device is provided to entrain a vegetable product such as a potato within a propelling stream of water or the like for cutting engagement with the knife elements. In production systems, the product is pumped one at a time in relatively rapid single file succession into and through the conduit with a velocity and kinetic energy sufficient to carry the product past the knife elements so that the product is severed into a plurality of smaller elongated strips at a relatively high production rate. The particular size and shape of the cut product strips is dictated by the geometry of the knife elements, and these cut strips are carried further by the flow stream through a discharge conduit which guides the strips to subsequent processing equipment for size grading, cooking, freezing, packaging, and the like. Such hydraulic cutting systems are commonly used for cutting raw potatoes into elongated French fry strips. Examples of hydraulic cutting assemblies and related water knife constructions are found in U.S. Pat. Nos. 3,109,468; 3,116,772; 3,208,625; 4,082,024; 4,135,002; 4,372,184; and 4,423,652.

In such hydraulic cutting systems, the individual products such as potatoes propelled along the flow conduit are subjected to substantial hydraulic pressure forces as the potatoes travel from the pumping device to and through cutting engagement with the knife elements of the water knife fixture. For example, in a typical French fry processing line, the individual potatoes are entrained within the propelling water stream at a pressure of about 15–20 psi, and are rapidly propelled by the water stream into cutting engagement with the knife elements at a velocity of about 40–60 feet per second. However, as the cut potato strips exit the water knife fixture, the cross sectional size and shape of the flow path has typically expanded, to create a significant fluid pressure drop and related turbulent fluid flow in combination with a rapid velocity decrease at that location. As a result, the cut strips tend to tumble within the flow passage as the fluid pressure is released and as the strip velocity is reduced for delivery of the strips to subsequent processing equipment. Unfortunately, the combined effects of the fluid pressure drop and turbulent fluid flow at the downstream side of the water knife fixture contributes to an undesirably high incidence of strip breakage, which can be on the order of about 25% for smaller strip cut sizes. Such strip breakage creates an abundance of undesirably small cut pieces which negatively impacts the overall commercial quality and utility of the cut strips. Indeed, in many production systems, the cut product strips must be size-graded to remove small broken pieces from the production flow.

There exists, therefore, a need for improvements in and to hydraulic cutting systems for cutting products such as potatoes into elongated strips, particularly with respect to reducing and substantially eliminating strip breakage as the cut strips travel from a water knife fixture to subsequent processing equipment. The present invention fulfills this need and provides further related advantages.

SUMMARY OF THE INVENTION

In accordance with the invention, an improved hydraulic cutting system is provided for cutting a succession of vegetable products or the like particularly such as potatoes into elongated strips, wherein the cutting system includes a deceleration conduit designed for decelerating cut product strips substantially without rapid pressure drop or flow stream turbulence to reduce or eliminate strip breakage.

The cutting system utilizes a propelling hydraulic flow stream to propel the products with substantial velocity into and through cutting engagement with knife blade elements of a so-called water knife fixture mounted along the length of a fluid flow passage. The cutting system includes a pump for entraining the products one at a time within a fluid flow stream of water or the like for product flow at a substantial velocity along a delivery conduit to the water knife fixture mounted at a downstream end of the delivery conduit. In a preferred form, the delivery conduit and the water knife fixture define a flow passage of substantially constant cross section, so that the product is subjected to a substantially constant and uninterrupted fluid pressure. A centering or alignment fixture may be incorporated along the delivery conduit at an upstream side of the water knife fixture for substantially aligning each product with a centerline of the flow passage, immediately prior to product engagement with knife elements of the knife fixture for cutting each product into elongated strips.

The deceleration conduit defines a continuation of the fluid flow passage at a downstream side of the water knife fixture. This deceleration conduit is designed to reduce the velocity of the cut strips substantially to a relatively slow velocity compatible with strip conveyance to subsequent processing equipment, such as blanching and/or frying steps in the case of French fried potatoes, substantially without exposing the cut strips to a rapid pressure drop or turbulent water flow conditions which could otherwise cause strip breakage. The deceleration conduit has an elongated tapered shape which expands gradually in cross section relative to a conduit centerline at an angle not exceeding 9° and preferably on the order of about 2° to about 3°. In a preferred configuration, this tapered deceleration conduit is mounted in-line with and at a downstream end of a substantially nontapered or constant cross section transition conduit coupled in turn to the downstream side of the water knife fixture. The transition conduit has a length which is several times, preferably about 8 times, the diameter of the flow passage exiting the water knife fixture, and functions to maintain the fluid pressure applied to the cut strips for a sufficient time to enable the propelling fluid flow to re-stabilize at the downstream side of the knife fixture. Thereafter, the expanding tapered geometry of the deceleration conduit gradually reduces the flow velocity of the cut strips, and the fluid pressure applied thereto, substantially without strip turbulence or tumbling within the flow stream.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
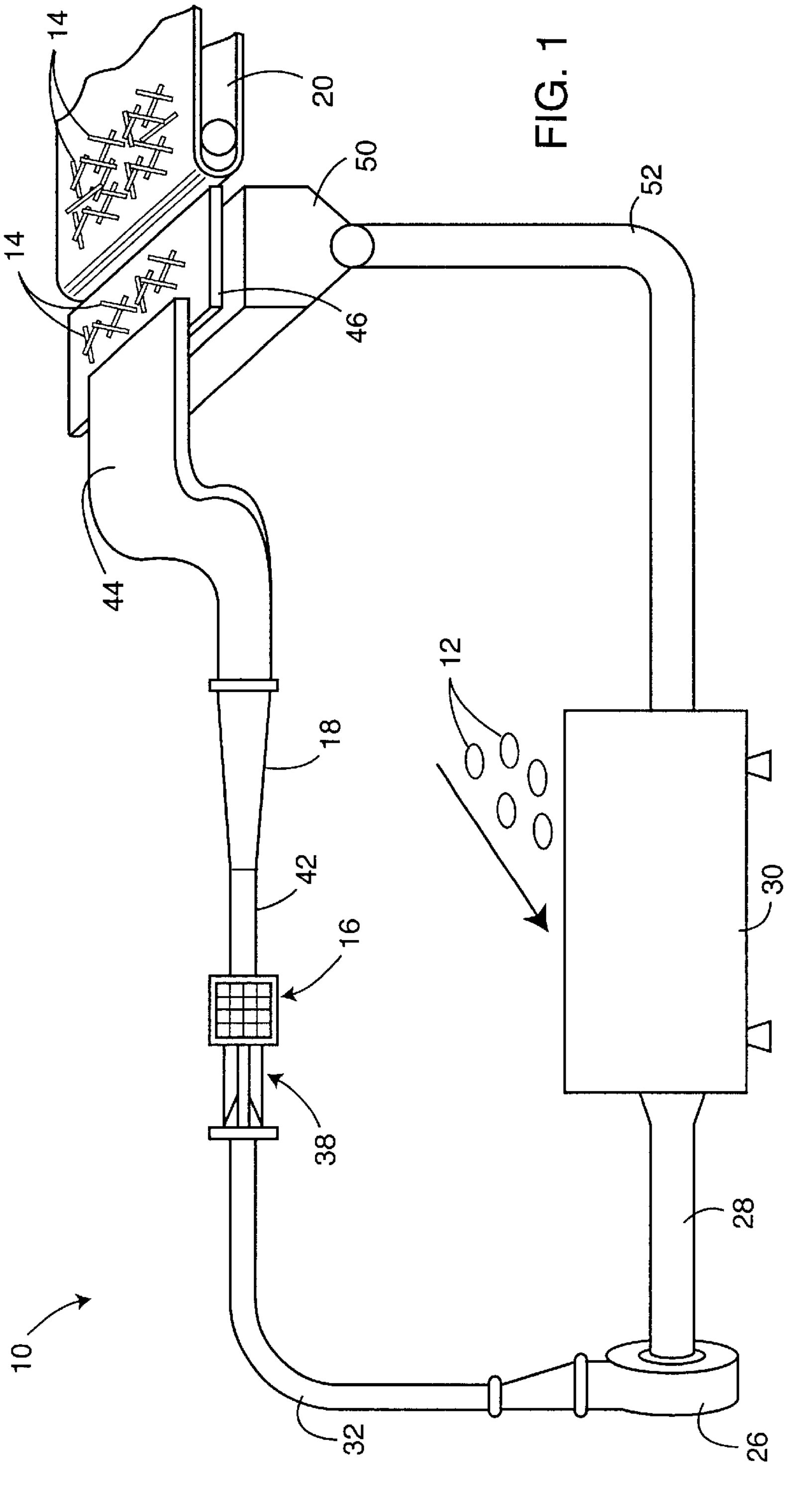
FIG. 1 is a side elevation view, shown somewhat in schematic form, illustrating an hydraulic cutting system including a so-called water knife fixture and an improved deceleration conduit embodying the novel features of the invention.

As shown in the exemplary drawings, an improved hydraulic cutting system referred to generally in FIG. 1 by the reference numeral 10 is provided for cutting a vegetable product 12 such as a potato or the like into a plurality of elongated strips 14. The cutting system 10 generally comprises a so-called water knife fixture 16 mounted along a tubular flow passage through which the products are propelled one at a time by a fluid flow stream such as water. In accordance with the invention, the cutting system 10 includes an improved deceleration conduit 18 for decelerating the cut strips 14 with little or no flow stream turbulence to correspondingly reduce and substantially-eliminate undesired breakage of the product strips as they are delivered from the cutting system 10 to a conveyor 20 or the like for further processing.

The overall general construction and operation of the hydraulic cutting system 10 is relatively conventional in the art, and is designed to propel any of a variety of products such as vegetable products, and more particularly such as whole potatoes 12, into cutting engagement with a plurality of knife elements or blades 24 of the water knife fixture 16. More specifically, the cutting system 10 includes a centrifugal pump 26 (FIG. 1) or the like which is appropriately driven to draw in potatoes 12 one at a time together with a propelling hydraulic fluid such as water through an inlet conduit 28 coupled to a supply reservoir 30 containing the potatoes and water. Within the supply reservoir 30, the potatoes 12 are subjected to a fluid pressure on the order of about 15–20 psi, and the supply of potatoes therein is suitably maintained in fluid suspension for facilitated intake flow through the inlet conduit 28 to the pump 26. The pump 26 propels the potatoes 12 in single file relation, by means of the propelling water flow stream, through an elongated tubular delivery conduit 32 into cutting engagement with the knife fixture 16. In a typical cutting system, the potatoes are propelled through the delivery conduit 32 at a relatively rapid speed of about 40–60 feet per second.

Figure 2:
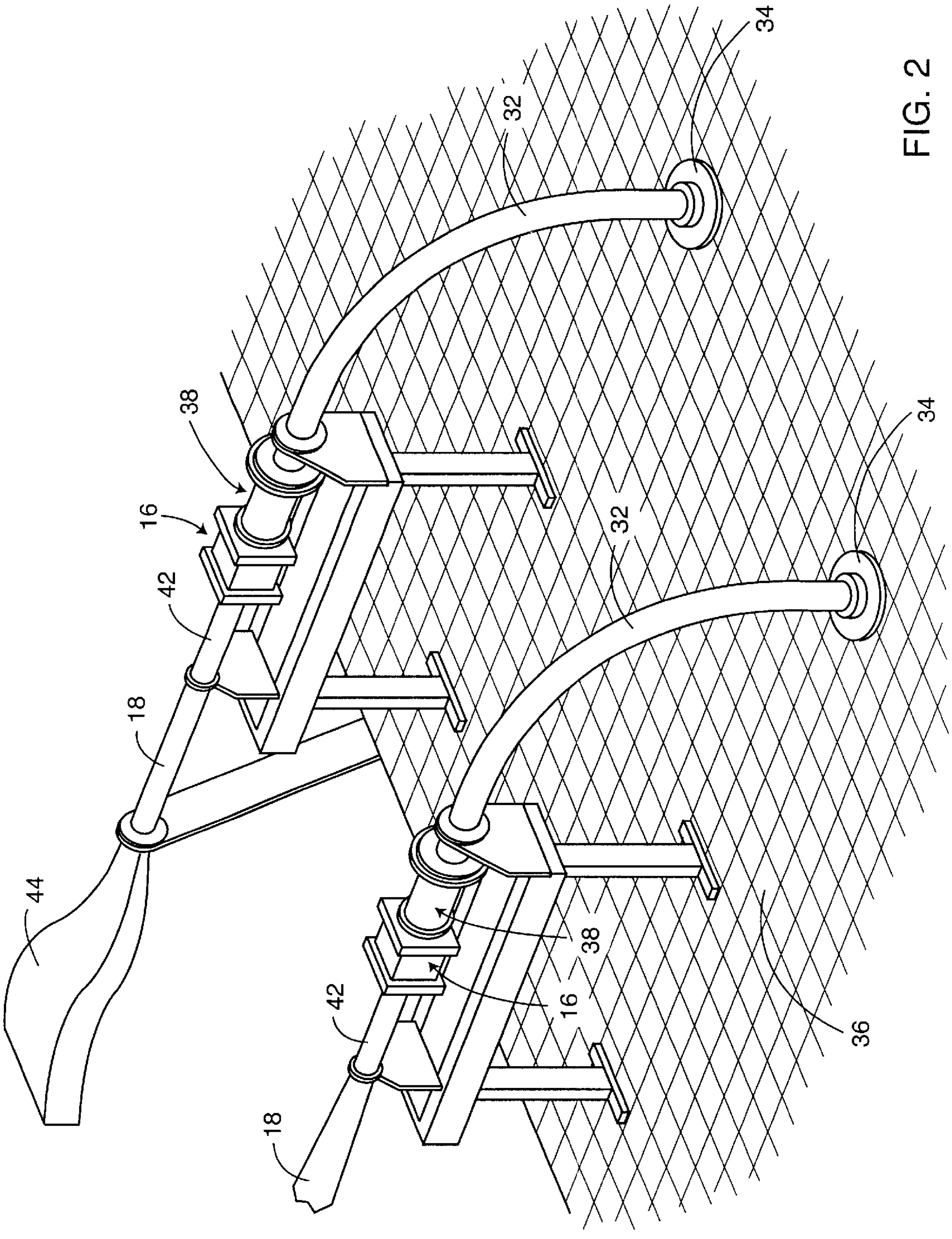
FIG. 2 is a fragmented perspective thereof.
Figure 3:
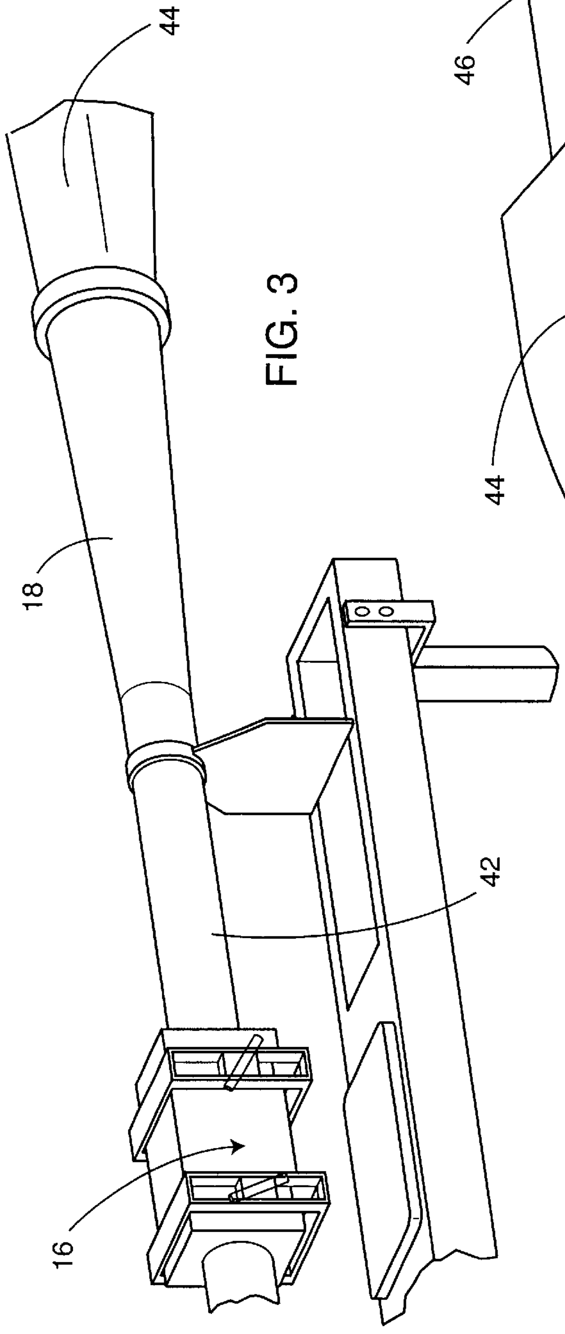
FIG. 3 is an enlarged fragmented perspective view showing the improved deceleration conduit.

The illustrative delivery conduit 32 is shown in FIG. 1 to extend vertically upwardly from a discharge side of the pump 26, and then to turn generally horizontally for connection to the water knife fixture 16. In this regard, the vertically extending leg of the delivery conduit 32 may extend through a suitable opening 34 formed in a floor 36, as shown in FIG. 2, whereby the pump 26 and related supply reservoir 30 can be mounted on a lower floor level beneath the knife fixture 16 to provide an overall space efficient cutting system configuration. In a preferred form, the cross sectional size and shape of the delivery conduit 32 is substantially constant, thereby maintaining a substantially constant fluid pressure applied to the potatoes 12 and further providing a substantially constant flow velocity as the potatoes travel into engagement with the water knife fixture 16.

FIGS. 1 and 2 shown a centering alignment fixture 38 mounted at a downstream end of the delivery conduit 32, and disposed in-line between the delivery conduit 32 and the knife fixture 16. This alignment fixture is designed for aligning each potato 12 in succession substantially with its longitudinal axis centered on a longitudinal centerline of the flow passage through the knife fixture 16. A variety of known alignment fixtures may be used, such as those shown and described in U.S. Pat. Nos. 3,109,468; 3,116,772; 3,208,625; 4,082,024; 4,135,002; and 4,423,652, all of which are incorporated by reference herein. The preferred alignment fixture 38 is configured to align the fluid-propelled potatoes while preferably maintaining a substantially continuous or constant cross sectional size and shape of the flow passage leading from the delivery conduit 32 to the knife fixture 16.

Figure 5:
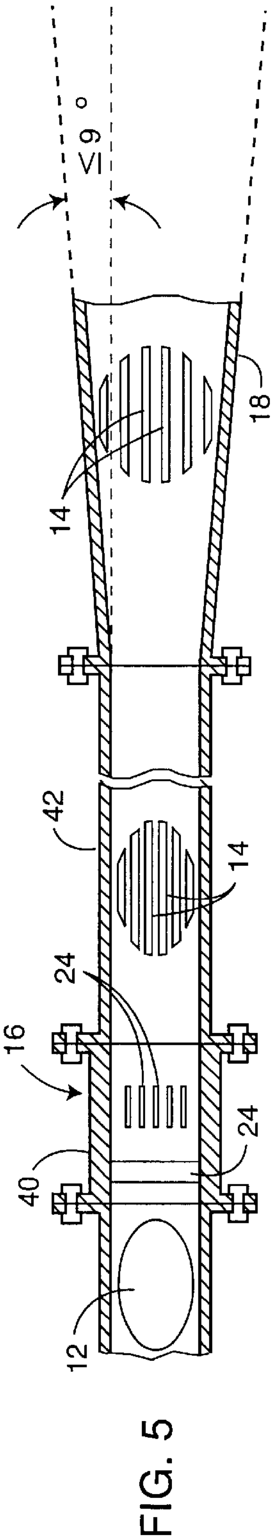
FIG. 5 is an enlarged fragmented, and somewhat schematic longitudinal sectional view illustrating flow passage of potatoes or the like through the water knife fixture and deceleration conduit.

The water knife fixture 16 comprises the plurality of knife elements 24 arranged to extend across the flow passage in a grid pattern selected to cut each potato 12 into the plurality of elongated strips 14 of selected cross sectional size and shape. FIG. 5 illustrates one configuration for the knife elements 24 wherein a first set of blades are mounted by a fixture housing 40 to extend generally vertically across the flow passage in spaced-apart parallel relation, and a second set of similar blades are mounted by the fixture housing 40 at a slightly downstream location to extend generally horizontally across the flow passage in spaced-apart parallel relation. The first group of knife elements 24 sever each potato into a plurality of vertically oriented slices, whereas the second group of knife elements in turn subdivides each slice into a plurality of the elongated strips 14. In this manner, each whole potato 12 is cut into strips 14, with strips cut from a central core region of the potato having a length greater than strips cut from the potato periphery. While a preferred knife fixture geometry in accordance with the invention comprises a continuation of the substantially constant cross sectional size and shape of the flow passage, as described in U.S. Pat. No. 4,372,184 which is incorporated by reference herein, persons skilled in the art will recognize and appreciate that alternative knife fixture constructions may be used.

Each potato 12 is propelled by the hydraulic flow stream through the delivery conduit 32 and the associated alignment fixture 38 with a sufficient momentum or kinetic energy to drive the potato through the knife fixture 16 so as to produce the desired cut strips 14. For proper cutting to occur, each potato must be propelled by the flow stream at a sufficient speed to pass entirely through the knife fixture 16, substantially without risk of the potato plugging or jamming within the knife fixture. As a result, each potato is subjected to relatively high forces upon engagement with the knife elements 24, and this cutting action is accompanied by substantial disruption of the fluid flow stream.

In a preferred configuration of the invention, a transition conduit 42 (FIGS. 1–3 and 5) is connected in-line with the knife fixture 16 at a downstream end thereof to initially receive the cut strips 14 and the propelling fluid flow stream exiting the knife fixture. This transition conduit 42 defines a continuation of the flow passage with substantially the same cross sectional size and shape, so that the fluid pressure applied to the cut strips 14 and the strip flow velocity is substantially maintained after the potatoes are cut into the strips 14. Such maintaining of the fluid pressure and product. strip velocity after cutting is believed to permit re-stabilization of the flow characteristics of the propelling fluid flow stream, while confining the cut strips to a non-expanding flow passage segment as viewed in FIG. 5 to correspondingly prevent end-to-end tumbling of the strips 14. While the length of the transition conduit 42 may vary, it is believed that a transition conduit length on the order of about 8 times the flow passage diameter permits adequate. re-stabilization of the flow stream. For example, in a cutting system having a constant flow passage diameter of about 2.5 inches up to and through the transition conduit 42, a preferred length of the transition conduit would be about 20 inches.

The deceleration conduit 18 comprises a tubular conduit mounted at the downstream end of the transition conduit 42, in the preferred configuration of the invention as illustrated in the accompanying drawings. As shown, the upstream end of the deceleration conduit 18 has a size and shape conforming to the transition conduit 42 for receiving the fluid flow stream and entrained cut strips 14. Importantly, the cross sectional geometry of the deceleration conduit 18 is tapered, whereby the cross sectional size expands gradually in a downstream direction for gradually slowing the velocity of the cut strips 14 and the propelling fluid flow stream. As the strip velocity is reduced, the hydraulic pressure applied to the cut strips 14 is also. reduced. In accordance with a primary aspect of the invention, this concurrent velocity and pressure reduction takes places gradually, with the result that undesired strip breakage which otherwise occurs when the strips are subjected to a rapid pressure fluctuation is substantially avoided.

Figure 4:
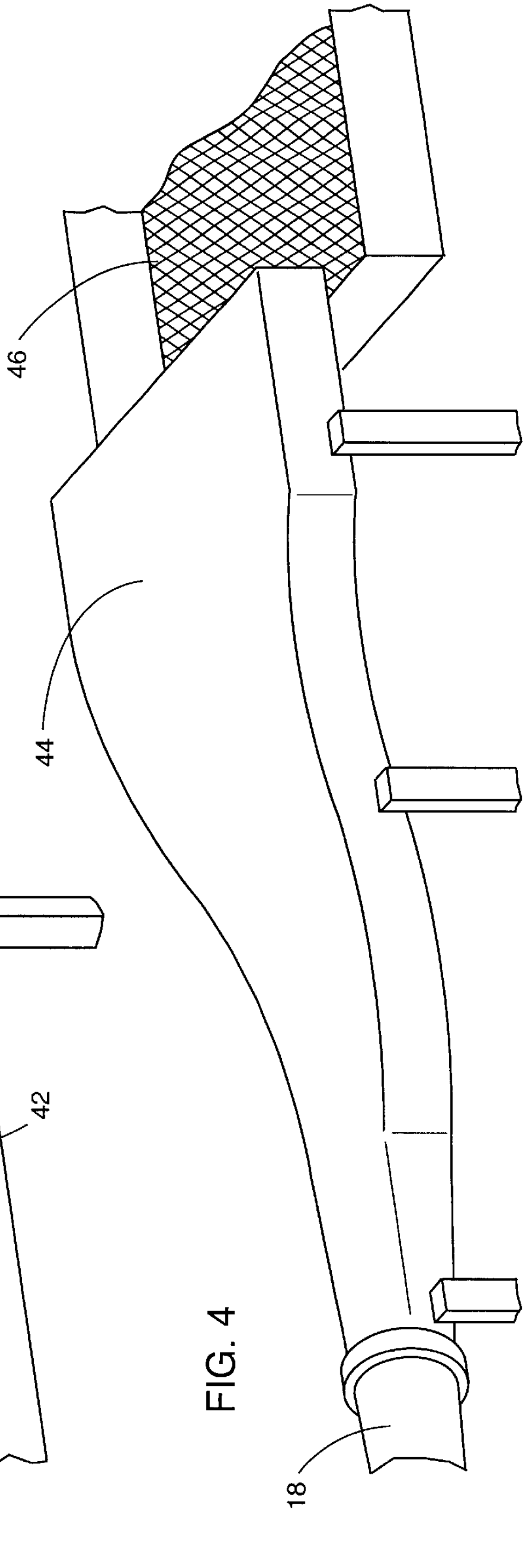
FIG. 4 is an enlarged fragmented perspective view depicting a discharge chute mounted at a downstream end of the deceleration conduit.

More particularly, the gradual expanding taper of the deceleration conduit 18 is selected for controllably reducing the strip velocity and the applied fluid pressure, substantially without encountering significant flow turbulence or related tumbling of the cut strips 14 within the expanding flow stream. In this regard, to avoid such turbulent flow while additionally avoiding significant strip tumbling which contributes to strip breakage, the deceleration conduit is shaped to expand at an angle not exceeding about 9° relative to a centerline longitudinal axis of the conduit 18. In a preferred configuration, the expansion angle or taper of the deceleration conduit 18 is substantially less than about 9°, and more preferably about 2° to about 3° relative to the centerline axis of the conduit 18. With this shape, as illustrated in FIG. 5, the cut strips 14 gradually expand and separate over the length of the deceleration conduit 18, with minimal or no tumbling within the fluid flow stream, as the strip are decelerated from about 40–60 feet per second over a length of about 4–6 feet for delivery to a relatively broad cross section discharge chute 44 (FIGS. 1–2 and 4). As depicted in FIG.1, the discharge chute 44 may include an elevated discharge end from which the cut strips 14 are deposited onto a suitable dewatering screen 46 (FIGS. 1 and 4) or the like. From the dewatering screen 46, the cut strips 14 are delivered further to the conveyor 20 (FIG. 1) or the like for conveying the strips to subsequent processing equipment, such as blanching and parfrying steps in the case of production of parfried and frozen French fried potato strips. The water separated from the cut strips is collected within a suitable trough 50 (FIG. 1) and recycled via a return conduit 52 or the like to the supply reservoir 30.

The deceleration conduit 18, which is desirably used in combination with the upstream-mounted transition conduit 42, effectively and significantly reduces undesired breakage of the cut strips 14 attributable in prior art cutting systems to turbulent flow and rapid pressure drop at the downstream side of the water knife fixture 16. Specifically, use of the transition and deceleration conduits 42 and 18, as described, has been demonstrated to reduce cut strip breakage in the production of shoestring size potato strips (about 0.30 inch by 0.30 inch square in cross section) from about 25% to a breakage rate of on the order of about 1% to about 2%. The deceleration system thus significantly increases the average length distribution of parfried and frozen French fried potato strips, and correspondingly significantly decreases the proportion of cut and broken strips which otherwise must be removed from the production flow as scrap or for use in other potato-based products.

A variety of modifications and improvements in and to the hydraulic cutting system of the present invention will be apparent to those persons skilled in the art. Accordingly, no limitation on the invention is intended by way of the foregoing description and accompanying drawings, except as set forth in the appended claims.

What is claimed is:

1. In an hydraulic cutting system for cutting a food product such as potatoes into elongated strips, said cutting system including a water knife fixture mounted generally at a downstream end of an elongated delivery conduit, and means for propelling the food product with a fluid flow stream into and through cutting engagement with the water knife fixture, the improvement comprising:

said delivery conduit and said water knife fixture defining a flow passage of substantially constant cross sectional size; and further including a deceleration conduit mounted generally at a downstream end of said water knife fixture, said deceleration conduit defining a tapered continuation of said flow passage which expands in cross section in a downstream direction relative to a centerline of said deceleration conduit at an angle sufficiently small to prevent substantial flow fluid flow stream turbulence and associated tumbling of cut strips.

2. The hydraulic cutting system of claim 1 further including an elongated transition conduit coupled in-line between said water knife fixture and said deceleration conduit, said transition conduit defining a substantial continuation of said flow passage of substantially constant cross sectional size at a downstream end of said water knife fixture.

3. The hydraulic cutting system of claim 2 wherein said transition conduit has a length of about 8 times the diametric size of said transition conduit.

4. The hydraulic cutting system of claim 1 further including a centering alignment fixture coupled in-line between said delivery conduit and said water knife fixture.

5. The hydraulic cutting system of claim 4 wherein said centering alignment fixture defines a substantial continuation of said flow passage of substantially constant cross sectional size at an upstream end of said water knife fixture.

6. The hydraulic cutting system of claim 1 wherein said deceleration conduit expands in cross section in a downstream direction at an angle equal to or less than about 9° relative to a centerline of said deceleration conduit.

7. The hydraulic cutting system of claim 1 wherein said deceleration conduit expands in cross section in a downstream direction at angle of about 2° to about 3° relative to a centerline of said deceleration conduit.

8. The hydraulic cutting system of claim 1 wherein said propelling means propels the food product into cutting engagement with said water knife fixture at a speed of from about 40 to about 60 feet per second.

9. The hydraulic cutting system of claim 8 wherein said deceleration conduit has a length of from about 4 to about 6 feet.

10. In an hydraulic cutting system for cutting a food product such as potatoes into elongated strips, said cutting system including a water knife fixture mounted generally at a downstream end of an elongated delivery conduit, and means for propelling the food product with a fluid flow stream into and through cutting engagement with the water knife fixture, the improvement comprising:

said delivery conduit and said water knife fixture defining a flow passage of substantially constant cross sectional size;

an elongated transition conduit coupled in-line between said water knife fixture and said deceleration conduit, said transition conduit defining a substantial continuation of said flow passage of substantially constant cross sectional size at a downstream end of said water knife fixture, said transition conduit having a length sufficient to permit substantial fluid flow stream restabilization at the downstream end of said water knife fixture; and further including a deceleration conduit mounted generally at a downstream end of said transition conduit, said deceleration conduit defining a tapered continuation of said flow passage which expands in cross section in a downstream direction relative to a centerline of said deceleration conduit at an angle sufficiently small to prevent substantial flow fluid flow stream turbulence and associated tumbling of cut strips.

11. The hydraulic cutting system of claim 10 wherein said transition conduit has-a length of about 8 times the diametric size of said transition conduit.

12. The hydraulic cutting system of claim 10 further including a centering alignment fixture coupled in-line between said delivery conduit and said water knife fixture.

13. The hydraulic cutting system of claim 12 wherein said centering alignment fixture defines a substantial continuation of said flow passage of substantially constant cross sectional size at an upstream end of said water knife fixture.

14. The hydraulic cutting system of claim 10 wherein said deceleration conduit expands in cross section in a downstream direction at an angle equal to or less than about 9° relative to a centerline of said deceleration conduit.

15. The hydraulic cutting system of claim 10 wherein said deceleration conduit expands in cross section in a downstream direction at an angle of about 2° to about 3° relative to a centerline of said deceleration conduit.

16. The hydraulic cutting system of claim 10 wherein said propelling means propels the food product into cutting engagement with said water knife fixture at a speed of from about 40 to about 60 feet per second.

17. The hydraulic cutting system of claim 16 wherein said deceleration conduit has a length of from about 4 to about 6 feet.

18. In an hydraulic cutting system for cutting a food product such as potatoes into elongated strips, said cutting system including a water knife fixture mounted generally at a downstream end of an elongated delivery conduit, and means for propelling the food product with a fluid flow stream into and through cutting engagement with the water knife fixture, the improvement comprising:

said delivery conduit and said water knife fixture defining a. flow passage of substantially constant cross sectional size;

an elongated transition conduit coupled in-line between said water knife fixture and said deceleration conduit, said transition conduit defining a substantial continuation of said flow passage of substantially constant cross sectional size at a downstream end of said water knife fixture, said transition conduit having a length of about 8 times the diametric size of said transition conduit; and further including a deceleration conduit mounted generally at a downstream end of said transition conduit, said deceleration conduit defining a tapered continuation of said flow passage which expands in cross section in a downstream direction at an angle equal to or less than about 9° relative to a centerline of said deceleration conduit.

19. The hydraulic cutting system of claim 18 further including a centering alignment fixture coupled in-line between said delivery conduit and said water knife fixture, said centering alignment fixture defining a substantial continuation of said flow passage of substantially constant cross sectional size at an upstream end of said water knife fixture.

20. The hydraulic cutting system of claim 18 wherein said deceleration conduit expands in cross section in a downstream direction at an angle of about 2° to about 3° relative to a centerline of said deceleration conduit.

* * * * *